Oct. 29, 1968   R. G. RUSHING   3,407,494
METHODS FOR EFFECTING COIL ALTERATIONS IN INDUCTIVE DEVICES
Original Filed July 28, 1966   4 Sheets-Sheet 3

FIG_5

FIG_6

Inventor:
Raymond G. Rushing,
by John M. Stoudt
Attorney.

United States Patent Office 3,407,494
Patented Oct. 29, 1968

3,407,494
METHODS FOR EFFECTING COIL ALTERATIONS IN INDUCTIVE DEVICES
Raymond G. Rushing, Mentor, Ohio, assignor to General Electric Company, a corporation of New York
Original application July 28, 1966, Ser. No. 568,594. Divided and this aplication Oct. 30, 1967, Ser. No. 678,795
14 Claims. (Cl. 29—606)

ABSTRACT OF THE DISCLOSURE

Methods for altering the configuration and position of an electrical winding with respect to a magnetic member. Either an electrical coil or a magnet carried in a fixture is supported adjacent to selected portions of the winding in the member for producing a magnetic field electromagnetically coupled with the selected portions, while a section of the fixture is supported between the coil or magnet and other portions of the winding for shielding the coil or magnet from the other winding portions. At least one electrical energy surge is generated in the winding to establish a transient magnetic field in the vicinity of the winding for changing the relative position of the winding with respect to the member.

*Cross-references to related applications*

This application is a division of my copending application Ser. No. 568,594, filed July 28, 1966 which in turn in part discloses subject matter disclosed in a still earlier filed application of mine, Ser. No. 414,826, filed Nov. 30, 1964 which issued on Aug. 1, 1967 as U.S. Patent No. 3,333,328.

*Background of the invention*

This invention relates generally to improved methods for effecting coil alterations in inductive devices, and more particularly to an improved method especially effective for transferring the electrical windings carried by a core, useful in a dynamoelectric machine, between initial and desired positions.

It has been the usual practice in fabricating dynamoelectric machines to loosely place the electrical windings in, for example, a motor stator, by machines which either wind the coils directly into the stator cores or which insert preformed coils into the stator cores. However, with each type of machine, after the windings are placed in the stator core, it is customary for the windings to be pressed back or transferred from the initial position to a final position in the vicinity of the slot bottoms located away from the bore. This transferring or press-back procedure has heretofore been accomplished by mechanical press-back features either built into the coil placing machinery or by separate, mechanical press-back machines. Obviously, either manner of achieving mechanical press-back of stator windings entails the use of expensive, bulky machinery which incidentally is relatively slow and inefficient in operation, as the stator coils are usually individually pressed-back by the use of elaborate fixtures. Separate fixtures are normally required for each core and/or slot design.

Another draw-back of existing mechanical press-back machines is that there is of necessity physical contact between the machine and the outer surfaces of the coils during the press-back operation, with the resulting possibility of damage to the conductor wire insulation.

It is therefore highly desirable to provide an improved method for effecting coil press-back in various inductive devices, such as motor stators, which is versatile, eliminating the problems of expense, lack of speed, and damage to the wire as encountered in the prior art. It is also desirable to provide a method for either simultaneously pressing back all of the coil groups carried for example in a stator core or pressing back only desired coils or coil groups, while avoiding direct contact between the press-back means and the conductor wires.

*Summary of the invention*

Accordingly, it is an object of the instant invention to provide improved methods for altering the electrical coils carried by inductive devices, such as dynamoelectric machines and the like.

Another object of the present invention is to provide improved, efficient and versatile methods for transferring the conductor turns of electrical coils carried by magnetic cores between initial and final positions which overcome at least some of the problems mentioned heretofore.

Another object of the present invention is to provide improved methods employing electrical energy for altering the configurations of one or more coils wherein selective alterations of the one or more coils may be achieved.

In accordance with a first aspect of my invention, in one form, I have provided an improved method for effecting coil alteration, especially effective in stator cores carrying an electrical winding, by way of illustration, one having four coil groups. The four coil groups are electrically connected to provide a closed path for the flow of inducted current. A first electrically conductive means is rigidly supported in electromagnetic coupling relationship with portions of first and third of the coil groups and shielded from second and fourth of the coil groups, and a second electrically conductive means is rigidly supported in electromagnetic coupling relationship with portions of first and third of the coil groups and shielded from second and fourth of the coil groups, and a second electrically conductive means is rigidly supported in electromagnetic coupling relationship with portions of the second and fourth coil groups and shielded from the first and third coil groups. The first and second electrically conductive means are serially connected together and one end of each is connected to an output terminal of a high energy electrical surge source and a pulse or surge of electrical energy is injected into the two electrically conductive means. The energy surge acts to establish a transient magnetic field about the two electrically conductive means and by induction, a transient surge of current flows in the four coupled coil groups in the same direction through cores of a given group and in the proper direction between adjacent groups. The coupled coil group portions are thus pressed back by the resulting electromagnetic force interaction between each electrically conductive means and the coil group portions coupled therewith. Additionally, rigid nonmagnetic or nonferrous electrically conductive structure capable of conducting eddy currents is supported adjacent the remaining portions of the four coil groups thereby pressing back or transferring these remaining portions by the electromagnetic interaction produced between the remaining portions and the structure.

With the improved methods of my invention, it is possible to effect press-back and alteration operations on electrical coils by an interaction of electromagnetic forces without having direct physical contact with the coil turns and without inducing damaging voltages between the coil turns. An important advantage of the present invention is that it is versatile, enabling efficient, rapid and inexpensive press-back and compaction of electrical coils in various induction devices.

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings.

*Description of the preferred embodiments*

Figure 1:
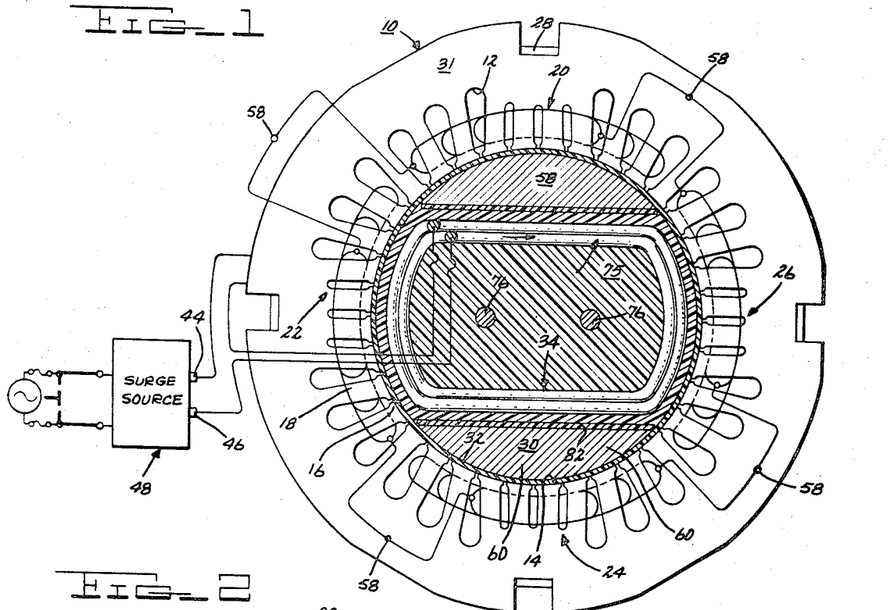
FIGURE 1 is an end view of a stator core having a coil carrying fixture in the bore thereof, with the fixture supporting a first coiled conductor in electromagnetic coupling relationship with portions of first and third opposed coil groups carried by the stator core, one end of the coiled conductor being connected in circuit with an energy surge source, and the coil groups of the stator core being short-circuited in accordance with one form of my invention.
Figure 2:
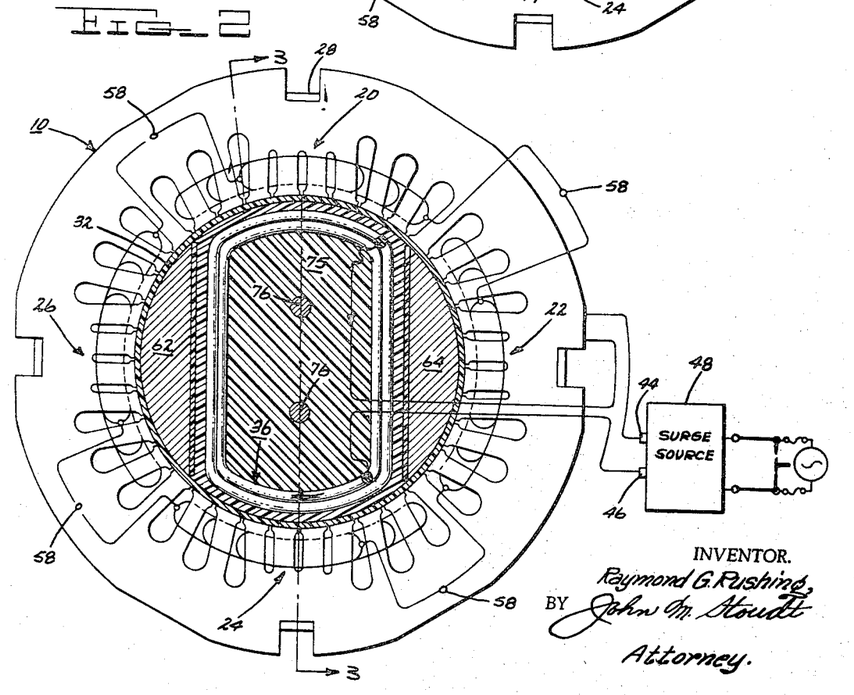
FIGURE 2 is a view similar to that of FIGURE 1 illustrating the other end of the stator core and the coil carrying fixture, the fixture supporting a second coiled conductor connected in series relation with the first coiled conductor and connected in circuit with the energy surge source, the second coiled conductor being in electromagnetic coupling relationship with portions of second and fourth opposed stator coil groups and being offset ninety mechanical degrees from the first coiled conductor.
Figure 3:
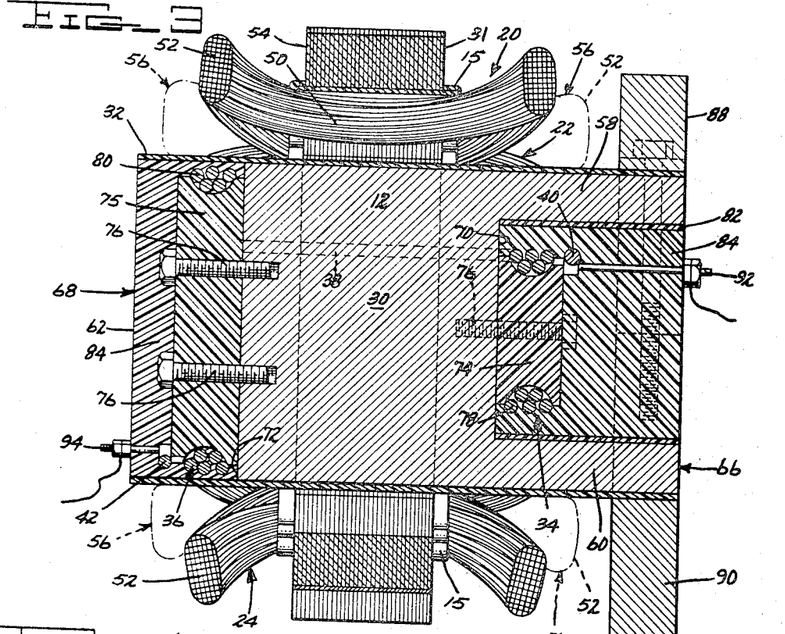
FIGURE 3 is a vertical sectional view, partially in side elevation, taken substantially on the plane of the line 3—3 of FIGURE 2, with two of the coil groups shown in their final press-back position relative to the stator core.

Turning now specifically to the drawings, and in particular to FIGURES 1 through 4 inclusive, I have illustrated various aspects of my improved method in connection with the simultaneous press-back of the electrical windings arranged in the slots of a dynamoelectric machine stator core generally denoted by reference numeral 10. In FIGURE 1, with reference to stator core member 10, the core slots identified by numeral 12 are equidistantly spaced about a central bore 14 of the stator core, the bore being defined by tooth lips 16 of stator tooth sections 18. The slots 12 are provided with slot liners 15, conventionally provided to insulate the conductor wires carried in the core from the core material. The stator core 10 illustrated in FIGURES 1–3 is a four-pole stator core having four coil groups, respectively denoted by reference numerals 20, 22, 24 and 26. The coil groups are each of the well-known distributed wound type, each including three sets of serially connected coils. The stator core member 10 is conventionally formed from a stack of magnetic laminations, stamped out of suitable thin sheet material, which are secured together by standard keys 28 frictionally received in grooves extending transversely across the stator core 10.

Referring specifically now to FIGURE 1, it will be observed that one end face 31 of the core member 10 is shown in elevation, the electrical winding including the aforementioned four coil groups being shown in schematic form. There is supported in the stator bore 14 a fixture or structure 30 of nonmagnetic electrically conductive material such as copper or aluminum. Further, insulation 32 is provided about the fixture 30 in order to insulate the fixture from the conductor wires of the various coil groups to prevent shorting therebetween. It will be understood that the insulation 32 may be a separate hollow cylindrical sleeve shaped to fit the bore 14, as illustrated, or may also be an integral insulation layer sprayed or otherwise applied directly to the outer surface of the fixture 30.

Figure 4:
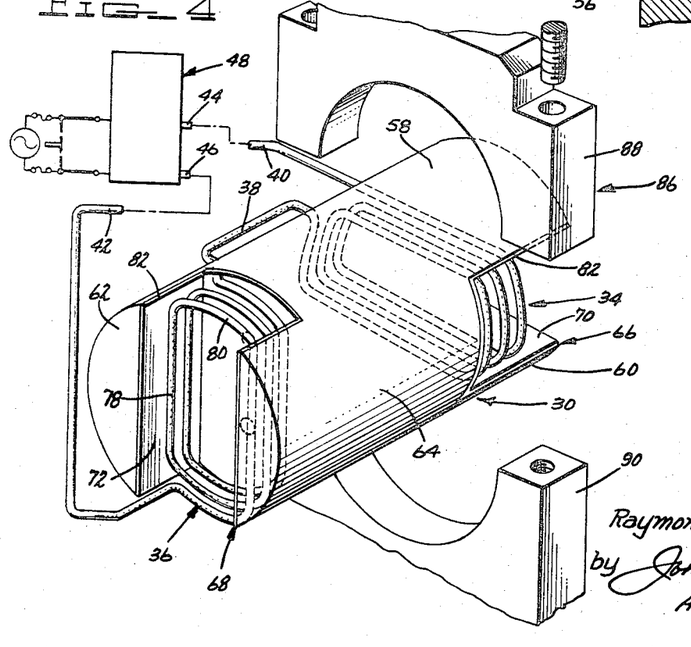
FIGURE 4 is a simplified perspective view of the fixture used in the practice of my invention in the form illustrated in FIGURES 1–3.

Referring now to FIGURES 3 and 4 in conjunction with FIGURE 1, it will be observed that an electrically conductive means in the form of a coiled electrical conductor generally denoted by reference numeral 34 is mounted in the fixture 30, the coiled conductor 34 being in electromagnetic coupling relationship with portions of the coil groups 22 and 26. It will also be seen that a second electrically conductive means in the form of a second coiled conductor 36 is supported in the other end of the fixture 30, the two coil conductors 34 and 36 being serially connected, as by connecting portion 38, as shown in the simplified illustration of FIGURE 4. Opposite ends 40 and 42 of the coil conductors 34 and 36 are respectively adapted for connection to the output terminals 44 and 46 of an energy surge source generally denoted by reference numeral 48. The second coiled conductor 36 is supported in electromagnetic coupling relationship with portions of the coil groups 20 and 24.

As illustrated in FIGURES 1–4 inclusive, the method comprising a first aspect of my invention is effective to press-back the coil groups 20, 22, 24 and 26 into the bottom of the slots 12, away from the bore 14 and press-back and compact the end turns, after the coil groups have been initially placed in the slots by a suitable machine for that purpose. With the coil groups loosely placed in the slots, the fixture 30 is moved into position in the bore 14, the fixture 30 incidentally acting to retain the loosely placed coils in the slots prior to their press-back. In the illustrated exemplification of my invention, the coil groups, each of which includes side portions 50 and connecting end turn portions 52, are simultaneously pressed-back and compacted. Thus, the side portions are pressed toward the bottoms of their respective slots, and the end turn portions 52 are pressed-back toward the opposed stator faces 31 and 54. The movement of the coil groups is best illustrated in FIGURE 3, wherein the final position of the coil groups 20 and 24 is represented by lines in full, while their initial position is represented by phantom lines 56. To achieve this end, as shown in the arrangement of FIGURES 1 and 2, the four coil groups are electrically connected by suitable interpole connections 58 to provide a closed path for the flow of induced current. It will be apparent by viewing FIGURES 1 and 2 that the coil groups 20, 22, 24 and 26 are connected in their normal fashion, i.e., with adjacent coil groups being oppositely wound to have opposite polarities. When the fixture 30 is inserted into the bore, the coiled conductor 36 is rigidly supported in electromagnetic coupling relationship with one of the end turn portions 52 of the coil groups 20 and 24 while being shielded from the end turn portions of the coil groups 22 and 26 in a manner to be discussed more fully hereinafter. Further it will be understood, while not specifically illustrated in FIGURE 3, that the coiled conductor 34 is rigidly supported in magnetic coupling relationship with one of the end turn portions 52 of the coil groups 22 and 26 inasmuch as the first and second coil conductors are in a 90° mechanical offset relationship with each other.

With the ends 40 and 42 of the coiled conductors 34 and 36 connected to the output terminals 44 and 46 of the energy surge source 48, at least one high energy surge is injected into the two serially connected coiled conductors, thereby establishing transient magnetic field about the two coiled conductors. The transient magnetic field produced about coiled conductor 34 links the adjacent end turn portions 52 of the coil groups 22 and 26, thereby inducing current flow in these coil groups. Similarly, the magnetic field about coiled conductor 36 induces current flow in coil groups 20 and 24. The four coil groups are serially connected to achieve additive current flow therethrough, and this current flow establishes magnetic fields at the end turn regions opposing the magnetic fields established about the coiled conductors 34 and 36. The interaction of these opposing magnetic fields will cause the electromagnetically coupled end turn portions 52 to be pressed-back, away from the rigidly supported coiled conductors 34 and 36, toward the stator faces 31 and 54 to their final positions as illustrated in FIGURE 3, and to be compacted or bundled together. It will be understood that only one end turn portion of each coil group, and not the remaining portions of the coil groups are electromagnetically coupled with the coiled conductors. Therefore, only the one coupled end turn portion of each coil group is displaced due to this coupling.

More particularly, it will be understood that the coiled conductor 34, while it is electromagnetically coupled with one of the end turn portions 52 of the coil groups 22 and 26, is shielded from the corresponding end turn portions 52 of the coil groups 20 and 24 by portions 58 and 60 of the structure 30 which lie between the coiled conductor 34 and the coil groups 20 and 24. Further, the coiled conductor 36 is electromagnetically coupled with one of the end turn portions 52 of the coil groups 20 and 24, but is shielded by the portions 62 and 64 of the structure 30 which lie between the coiled conductor 36 and the coil groups. It is believed that the shielding effect occurs due to the particular composition of the structure 30, i.e., its nonmagnetic electrically conductive composition which enables it to conduct eddy currents. The circulating eddy currents generate a magnetic field which apparently opposes or suppresses the carrying of flux lines in the structure portions between the coiled conductor 34 and the coil groups 20 and 24 and between the coiled conductor 36 and the coil groups 22 and 26, thereby producing a shielding effect.

It will be observed in FIGURE 3 that the side portions 50 of the various coil groups are also pressed-back in accordance with my method. Further, the end turn portions of the coil groups which are not electromagnetically coupled by the coiled conductors 34 and 36 are also pressed-back toward the core faces and compacted. This press-back of the remaining portions of the coil groups, i.e., the portions other than the coupled end turn portions is accomplished by supporting the electrically conductive nonmagnetic structure 30 adjacent these remaining portions of the coil groups. Thus, when current is induced into the four coil groups, eddy currents will be generated in the structure 30 adjacent the remaining portions of the coil groups, establishing a transient magnetic field which coacts with the magnetic field about the remaining portions of the coil groups, transferring the remaining portions to the desired final position. It should therefore be appreciated that by this aspect of my invention, I am able to simultaneously press-back and compact the four coil groups 20, 22, 24 and 26 carried by the stator core 10 without physically contacting the conductor wires comprising the coil groups. Further, the press-back and compaction occurs rapidly and efficiently, without the necessity of inserting any mechanical means into the core slots 12 in order to effect such compaction and press-back.

If it is desired to press-back only two opposing coil groups of the stator core at one time, my method, by way of example, can advantageously be practiced, by arranging the interpole connections 58 between the coil groups to provide a closed path only between two opposing coil groups such as groups 20 and 24 or 22 and 26. At this time, the injection of an energy surge into the coiled conductors 34 and 36 will generate transient magnetic fields about each coiled conductor and current flow will be induced in the connected pair of coil groups. No current will be induced, however, in the unconnected coil groups, and hence no transfer of these coil groups will occur. Further, it will be understood that my method may be practiced with other than the four-pole stators as illustrated in FIGURES 1–4, as for example a six-pole stator. When practicing my invention with a six-pole stator, the coil groups carried by the stator may be interconnected in their usual manner thereby to provide a closed electrical path for induced current, and the fixture 30 positioned to electromagnetically couple end turn portions of only two opposing pairs of coil groups to accomplish the desired coil press-back. The fixture may then be rotated to electromagnetically couple portions of the other coil groups as required to accomplish the desired coil press-back.

In the practice of the above-described method, the fixture or structure denoted by reference numeral 30 and briefly described above may be employed. It will be observed in FIGURE 4 that the fixture 30 includes an elongate generally cylindrical body, constructed of electrically conductive nonmagnetic material such as copper or aluminum. While I have shown the fixture 30 as a solid cylinder, it will be appreciated that it may also be a hollow cylinder, so long as it is able to conduct eddy currents and support the coiled conductors 34 and 36 therein of the illustrated exemplification.

In order to support the coil conductors 34 and 36 in the fixture 30, I have provided in opposite ends 66 and 68 the slots 70 and 72, the slots being ninety mechanical degrees angularly offset from each other. The slot 70 is open at opposite ends of the fixture 30 and closed at the sides by the shielding fixture portions 58 and 60 while the slot 72 is open at opposite ends and closed at the sides by the shielding fixture portions 62 and 64. It will be readily apparent by viewing FIGURES 1–4 that the slots are generally of the same width and length, the only difference therein being in the relative offset or rotated positions of the slots in opposite ends of the fixture 30.

Referring now to FIGURES 3 and 4, it will be observed that the coiled conductors 34 and 36, while illustrated in simplified form in FIGURE 4, are in actuality wound on similar insulated forms 74 and 75, the forms being mounted by suitable mounting means such as the screws 76 in the bottoms of the slots 70 and 72. The insulated forms are provided to enable the coiled conductors to be formed in their illustrated configuration, to provide means for mounting the coiled conductors in the slots, and to prevent electrical shorting between the coiled conductors and the structure 30 when an energy surge is injected into the coiled conductors in accordance with my method. Each coiled conductor 34 and 36 includes a number of wound turns, which by being wound on the forms 74 and 75, are provided with long sides 78 joined by short sides 80. As will be appreciated, the short sides 80 are relatively flat and are supported substantially adjacent the outer surface of the fixture 30 while the long sides 78 are shielded by the fixture portions 58, 60, 62 and 64 as explained above. This particular arrangement of the coiled conductors 34 and 36 is provided in order to place the short sides 80 as close as possible to the end turn portions of the coil groups to which they are electromagnetically coupled to provide the most efficient magnetic coupling therebetween. Further, it will be observed that the sides and bottom walls of the slots 70 and 72 are provided with insulation 82, thereby to insure against the possibilty that the coil conductors may come into electrical contact with the structure 30. In order to further avoid the possibility of shorting, and to secure the forms 74 and 75 in the fixture 30, after the coil conductors are wound on the forms 74 and 75, and the forms mounted in the slots on the bottom walls thereof by the screws 76, the slots are filled with a cured thermosetting epoxy resinous material 84 to encase the forms 74 and 75 and their coiled conductors, thereby firmly establishing the desired relationships of the coiled conductors in the fixture 30.

In order to support the fixture 30 to carry out my method, a supporting structure generally denoted by reference numeral 86 and including an upper portion 88 and a lower portion 90 is provided (FIGURES 3 and 4). The end 66 of the fixture 30 is elongated relative to end 68, in order to enable the fixture to be supported in the structure 86, with the coiled conductor 34 positioned adjacent the electromagnetically coupled end turn portions 52 of coil groups 22 and 26.

In order to electrically connect the coiled conductors 34 and 36 to the surge source 48, a terminal 92 is mounted in the slot 70 of the fixture 30, with one end suitably attached to the form 74, and with the end 40 of the coiled conductor 34 suitably attached to this end of the terminal. The terminal 92 is firmly mounted in the fixture 30 as it is encased in the resinous material 84. Similarly, a terminal 94 is mounted in the slot 72 with one end attached to the form 75, one end 42 of the coiled conductor 36 connected to the terminal to enable coiled conductor 36 to be connected to the surge source 48. Thus, by referring to FIGURES 1 and 2 in conjunction with FIGURE 3, it will be observed that the ends 42 and 40 of the coiled conductors are respectively connected by means of the fixture terminals 94 and 92 to the source output terminals 44 and 46, and by virtue of the connecting portion 38, serially connected with each other.

When an energy surge is produced at the source output terminals 44 and 46, a surge of current will flow through the two coiled conductors 34 and 35, and since the coiled conductors 34 and 36 are oppositely wound, current surge will flow oppositely therethrough thereby producing transient magnetic fields of opposite polarity in accordance with the practice of my method. It is necessary to establish opposite magnetic fields about the two coils 34 and 36 when the coil groups 20, 22, 24 and 26 are connected in their normal manner as illustrated in FIGURES 1 and 2 in order to produce additive current flow through the coil groups. It will be realized, of course, that it is the manner in which the interpole connections 58 are made between the coil groups which affects the current path therethrough.

Figure 5:
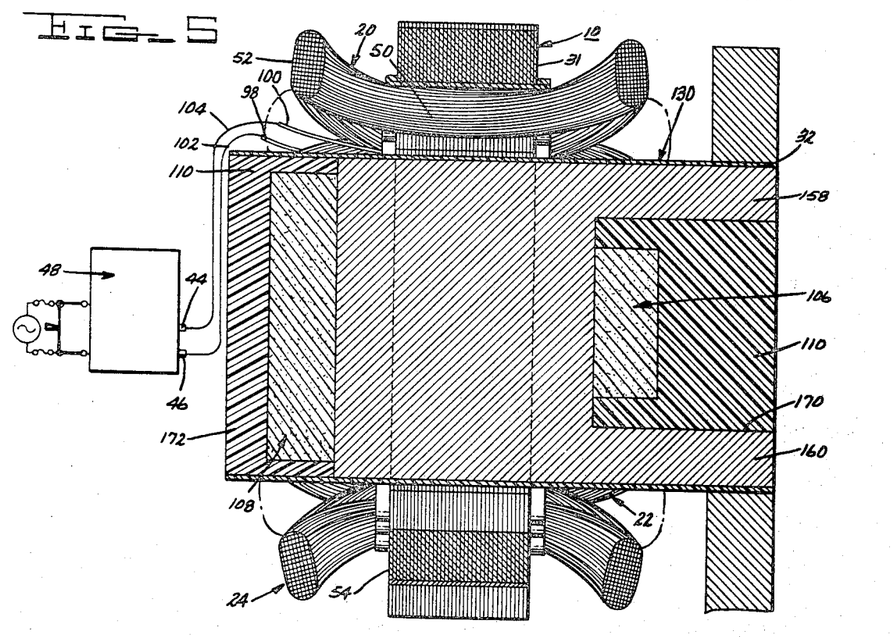
FIGURE 5 is a view similar to that of FIGURE 2 illustrating the stator core and coil groups partially in section and partially in elevation, a modified fixture being supported in the stator bore and the coil groups shown connected in circuit with an energy surge source in accordance with another aspect of my invention.
Figure 6:
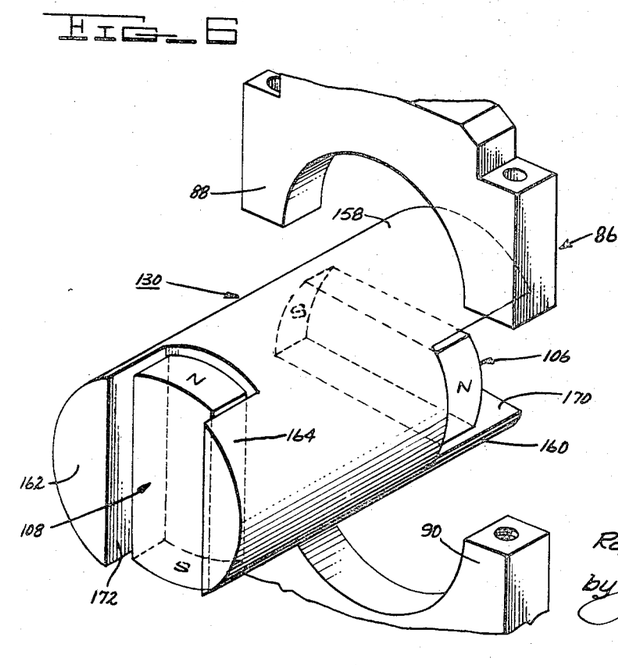
FIGURE 6 is a simplified perspective view of the modified fixture illustrated in FIGURE 5.
Figures 7, 8:
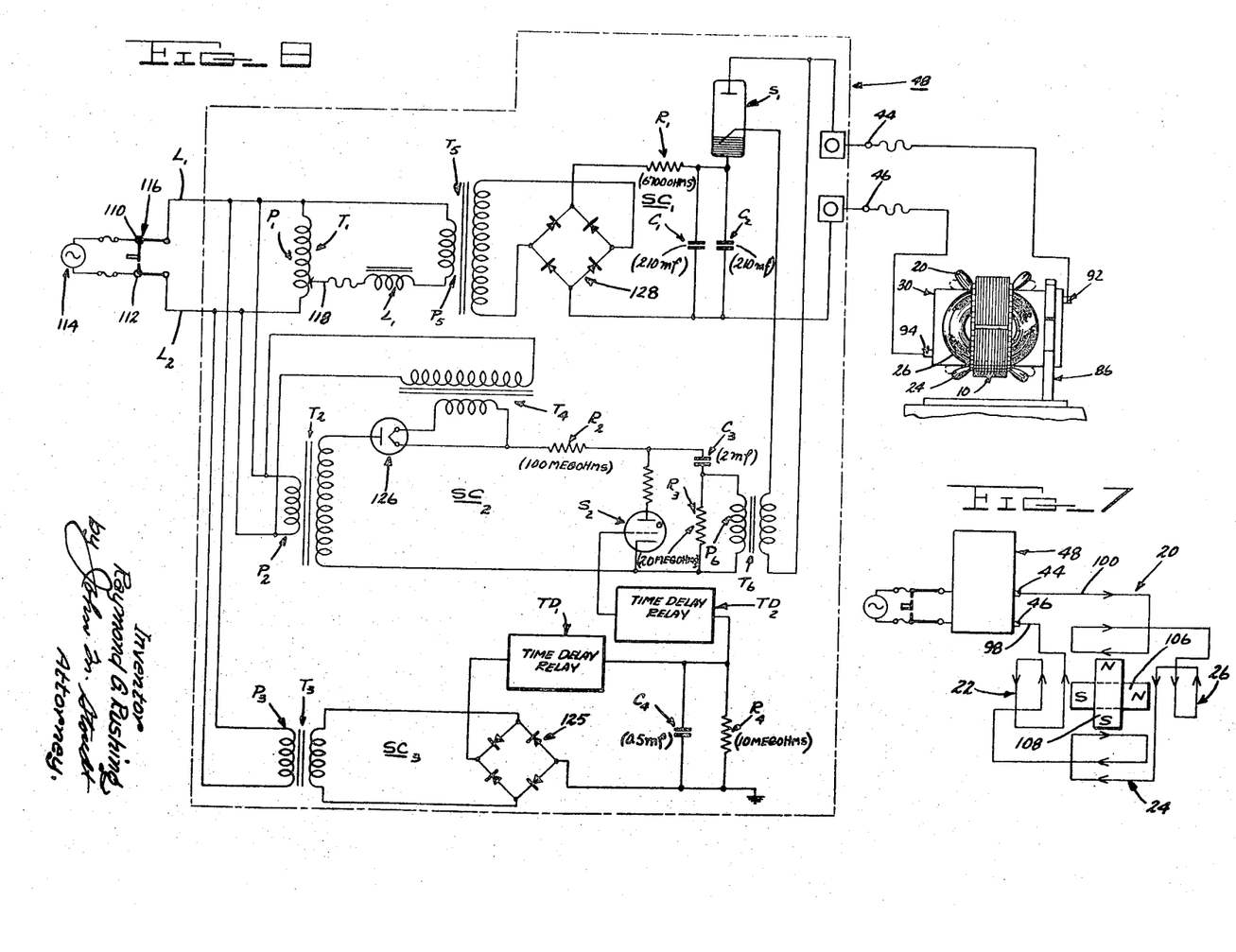
FIGURE 7 is a schematic circuit diagram of a polar development of the stator coil groups shown in FIGURE 5, with the coil groups connected in circuit with the energy surge source and the pair of magnets mounted in the fixture respectively supported in coupled relationship with opposed portions of the coil groups.
FIGURE 8 is a schematic circuit diagram of one form of an energy surge source for use in carrying out my invention.

Turning now to the arrangements disclosed in FIGURES 5-7 inclusive, I have shown a variation of the arrangements of the first and second exemplifications of my invention for pressing back the coil groups 20-26.

In FIGURE 5 for example, I have illustrated a stator core 10 identical to the stator core described in reference to FIGURES 1-3 above. The stator core 10 includes the same four coil groups 20, 22, 24 and 26, and as a matter of convenience, like parts of the stator core are identified by like reference numerals. In this exemplification of my invention, I have connected free and opposite ends 98 and 100 of the stator winding to electrical leads 102 and 104 and these leads to the output terminals 46 and 44 of the surge source 48. It will be understood that by such connections, when the surge source 48 is energized, a high energy surge of current is injected into the coil groups 20-26 of the stator core 10, and by the instantaneous current flow therethrough a dynamic magnetic field is produced about the four coil groups.

In accordance with this aspect of my invention, I have rigidly supported a fixture or structure 130 in the bore 14 of the stator core 10 by means of the supporting structure 86. The fixture 130 is similar in some respects to the fixture 30 described above. Thus, the fixture 130 comprises an elongate cylindrical body of electrically conductive nonmagnetic material such as copper or aluminum and includes the slots 170 and 172 in the opposite ends thereof as in the fixture 30. The slots 170 and 172 are offset or rotated 90 mechanical degrees from each other. As will be apparent by viewing FIGURES 5 and 6, the slots 170 and 172 are open at each end and are closed at the sides by the shielding portions 158, 160 and 162, 164 of the fixture 130 respectively. Further, a cylindrical sleeve 132 of insulating material embracingly engages the outer peripheral surface of the structure 130 in order to insulate the structure from the core carried coil groups.

In order to provide a magnetic field to interact with the dynamic magnetic field formed about the end turn portions 52 of the four coil groups carried by the core 10, first and second means for producing magnetic fields in the form of elongate bar type permanent magnets 106 and 108 are respectively mounted in the slots 170 and 172 of the fixture 130. The magnets are secured in the slots by a thermosetting epoxy resinous material 110, which, as will be apparent from FIGURE 5, fills the slots thus rigidly mounting the magnets 106 and 108 therein. The magnets are thus supported in 90 degrees offset relation with each other and their respective polarities are indicated in FIGURE 6. It will be seen that the ends of the magnets 106 and 108 are relatively close to the outer peripheral surface of the fixture 130 while the sides of the magnets are shielded by the aforementioned fixture portions 158 and 160 and 162 and 164, respectively. This shielding effect is believed to be identical to the effect described above. The magnet 108 is thereby in electromagnetic coupling with the end turn portions 52 of coil groups 20 and 24 extending from the stator face 54, while the magnet 106 electromagnetically couples the end turn portions 52 of the coil groups 22 and 26 extending from the stator face 31.

When an energy pulse is injected into the coil groups 20-26 and the dynamic magnetic field is produced thereabout, the interaction between the permanent magnet fields and the dynamic magnetic fields will cause the aforementioned end turn portions 52 of coil groups 20 and 24 and 22 and 26 to be pressed-back towards the stator faces 54 and 31 respectively. Further, since the structure 130 is electrically conductive nonmagnetic material capable of conducting eddy currents, there will be produced in the structure transient magnetic fields which will coact with the magnetic fields about the remaining portions of the coil groups and thereby cause these remaining portions to be pressed-back and compacted in the manner more fully explained in my now issued U.S. Patent 3,333,328, granted Aug. 1, 1967. Thus, the side portions 50 of the various coil groups will be pressed-back into the bottoms of the stator slots and the other end turn portions will be pressed-back towards the stator faces 31 and 54 and also compacted. This movement of the coil groups is illustrated in FIGURE 5 with the original position of the coil groups being shown by lines in phantom and the final position being shown by lines in full.

Referring again to FIGURE 6, it will be seen that a supporting structure 86 including an upper portion 88 and a lower portion 90 is provided in order to support the fixture or structure 130, thereby to allow a stator core such as the core 10 to be supported on the fixture in order to accomplish my method. In accordance with this aspect of my invention, the magnet 106 is rigidly supported in electromagnetic coupling with one of the end turn portions 52 of the coil groups 22 and 26, the magnet 106 being shielded from the coil groups 20 and 22 by the portions 158 and 160 of the fixture 130. The magnet 108 is rigidly supported in electromagnetic coupling with the end turn portions 52 of the coil groups 20 and 24 while being shielded by the fixture portions 162 and 164 from the coil groups 22 and 26. The coil groups 20-26 are serially connected for providing a closed path of current therethrough, and opposite ends 98 and 100 thereof are connected to the output terminals 44 and 46 of an energy surge source 48, a high energy surge being injected into the coil groups. The instantaneous current in the coil groups produces a transient magnetic field thereabout which interacts with the fields produced by the magnets 106 and 108 as well as the fields produced by the eddy currents in the fixture 130, thereby transferring the coil groups 20–26 to their desired final position in the stator core 10 by the resulting interaction of magnetic forces.

In order to understand how the stator coil groups 20–26 are wound and their relative position to the magnets 106 and 108, reference may be made to FIGURE 7. I have shown a schematic circuit diagram of a polar development of the stator coil groups 20–26, with the ends 98, 100 of the coil groups 22 and 20 shown connected to the output termintls of the energy surge source 48, and the magnets 106 and 108 supported in magnetic coupling relation with the end turn portions of opposed coil groups. It will be seen by the indicating arrows on the schematic representations of the coil groups in FIGURE 7 that current will flow through the serially connected coil groups due to the interpole connections therebetween. Further, it will be seen that the magnets 106 and 108 are positioned to present opposing magnetic fields to the end portions of opposed coil groups, thereby to cause the required interaction of magnetic forces between the transient and fixed fields, and to transfer the end turn portions away from the rigidly supported magnets.

Having specific reference now to FIGURE 8, I will now more fully describe the operation of the energy surge source 48 as shown generally in FIGURES 1, 2, 4, 5 and 7 in block diagram form. The source 48 has a bank of capacitors $C_1$ and $C_2$ connected in parallel to provide a high energy surge or pulse of preselected magnitude. The capacitors are charged to a selected voltage level and selectively discharged by ionizing an ignitron $S_1$ to a conductive state. In the practice of my invention, it is desirable to arrange the surge source 48 for supplying energy of up to 8,820 joules, using capacitors rated at 210 microfarads.

The energy surge source 48 is effectively divided into, and can best be described by referring to three subcircuits denoted as $SC_1$, $SC_2$, $SC_3$, each of which is connected across input leads $L_1$ and $L_2$. The input leads $L_1$ and $L_2$ connect to input terminals 110 and 112 which are adapted for connection to a suitable alternating supply 114 such as a 120 volt, 60 cycle commercial supply, to normally open switch 116. The switch 116 is a double pole, single throw switch provided in order to make power immediately available to the three subcircuits and to deenergize the source 48 when not in use.

Prior to energizing the source 48 by closing switch 116, the control arm 118 of a control autotransformer $T_1$ is set to regulate the voltage to the desired level for charging the capacitors $C_1$ and $C_2$ of the capacitor bank. Upon closing switch 116, the primary windings $P_2$ and $P_3$ of power supply transformers $T_2$ and $T_3$ respectively and the winding $P_1$ of autotransformer $T_1$ are immediately energized. The transformers $T_2$ and $T_3$ respectively provide the input power supplies for subcircuits $SC_2$ and $SC_3$ while autotransformer $T_1$ regulates the initial level of charging voltage supplied to the capacitor bank.

The power supply transformer $T_3$ provides 110 volt alternating current to a solid state rectifier bridge 125, which in turn supplies full wave rectified direct current through normally closed time delay relay $TD_1$ thereby charging capacitor $C_4$ almost instantly. Simultaneously, the power supply transformer $T_2$ provides 1400 volts alternating current to a half wave rectifier 126, which is excited by the output of transformer $T_4$. Subsequently, a current limiting resistor $R_2$ which is interposed in the output line of the rectifier 126, allows the capacitor $C_3$ to quickly reach a full charge of approximately 1400 volts. At this time, a thyratron $S_2$, which is connected in parallel with the capacitor $C_3$, is nonconducting as it has insufficient grid potential to cause ignition.

While the capacitor $C_3$ is being charged, the output of the control autotransformer $T_1$ is applied across the primary winding $P_5$ of a step-up transformer $T_5$. To limit the peak current, a choke $L_1$ is connected in series with the winding $P_1$ of autotransformer $T_1$. The output of transformer $T_5$, at a voltage predetermined by the setting of autotransformer $T_1$, is fed to a solid stator rectifier bridge 128. The rectifier bridge in turn feeds fully rectified current through a current limiting resistor $R_1$ in order to charge the capacitor bank $C_1$ and $C_2$ to the predetermined voltage level.

Subsequently, after a preset time interval, the normally closed time delay relay $TD_1$ opens, removing capacitor $C_4$ from its charging circuit. Coinstantaneously a normally open time delay relay $TD_2$ closes, allowing the capacitor $C_4$ to discharge across a resistor $R_4$, driving the grid of thyratron $S_2$ positive, thereby causing the thyratron $S_2$ to ignite. As thyratron $S_2$ ignites, the capacitor $C_3$ discharges across a resistor $R_3$ and through the primary winding $P_6$ of a pulse transformer $T_6$. The output from transformer $T_6$ drives the ignitron $S_1$ to conduction, thereby allowing the capacitor bank $C_1$, $C_2$ to be discharged across the output terminals 44 and 46 of the source 48. The transformer $T_6$ is a 1:1 isolation transformer which is provided to prevent the possibility of the high voltage output through ignitron $S_1$ being fed to subcircuits $SC_2$ and $SC_3$ and thereby injuring operating personnel. Thus, it is apparent that the exemplified source 48 is unusually safe in operation.

In order to provide a specific illustration of the energy surge source 48 as described above, values of several circuit components employed in actual practice have been identified in FIGURE 8. It will be recognized by those skilled in the art that energy surge sources other than source 48 of the exemplification may be utilized to practice the method of the instant invention without departing from the scope and spirit thereof. However, the illustrated source 48 is especially desirable in practice due to its inherent safety features.

From the foregoing description of the methods exemplifying my invention, it will be apparent that various coil press-back and compacting operations on inductive devices such as stator cores, armatures and other coil-accommodating members can be economically and efficiently accomplished without utilizing mechanical members physically contacting the windings. Further, the coil pressback operations can be selectively accomplished without the need for special connections to be made to the windings or coil groups carried by the stator core.

It will be appreciated that in accordance with my invention, permanent magnets may be supported adjacent the end turn portions 52 of the coil groups in order to aid in the contouring of the end turn portions as they are pressed-back toward the faces 31 and 54 of the stator core. The permanent magnets for aiding in the contouring of the end turn portions of the coil groups may be rigidly supported on the opposite side of the end turn portions as the coiled conductors 34 and 36 or the permanent magnets 106 and 108, being of the proper polarity to attract the coil group end turn portions.

While in accordance with the Patent Statutes, I have described what at present are considered to be the preferred embodiments of my invention, it will be obvious to those skilled in the art that numerous changes and modifications may be made therein without departing from the invention. It is therefore intended in the appended claims to cover all such changes and modifications that fall within the true spirit and scope of my invention.

What I claim as new and desire to secure by Letters Patent of the United States is:

1. A method of transferring between initial and desired positions the electrical winding carried by a core having a bore, the core being useful in a dynamoelectric machine, the electrical winding comprising at least four coil groups including first, second, third and fourth groups, each said coil group having two side portions and two end turn portions, the method comprising the steps of: rigidly supporting an electrically conductive means for producing a magnetic field in electromagnetic coupling with one of the end turn portions of the first and third coil groups; shielding said electrically conductive means from the second and fourth coil groups; electrically connecting at least the first and third coil groups to provide a closed electrical path for the flow of current; establishing a transient magnetic field about the electrically conductive means by injecting a transient electrical pulse into the electrically conductive means, thereby inducing current flow in the first and third coil groups and transferring the one end turn portions of the first and third coil groups to a desired position in the core by the electromagnetic interaction between the electrically conductive means and the one end turn portions.

2. The method of claim 1 wherein the step of shielding said electrically conductive means from the second and fourth coil groups includes supporting electrically conductive nonmagnetic structure between said electrically conductive means and said second and fourth coil groups, thereby generating eddy currents in said electrically conductive nonmagnetic structure and producing an opposing and suppressive magnetic field between said electrically conductive means and said second and fourth coil groups.

3. The method of claim 1 including the additional steps of supporting a rigid electrically conductive nonmagnetic structure capable of conducting eddy currents adjacent the side portions of the first and third coil groups and thereby transferring the side portions of the first and third coil groups to a desired position in the core by the electromagnetic interaction between the two side portions and the electrically conductive nonmagnetic structure.

4. The method of claim 1 including the additional steps of rigidly supporting a second electrically conductive means for producing a magnetic field in electromagnetic coupling with one of the end turn portions of the second and fourth coil groups, shielding the second electrically conductive means from the first and third coil groups, and electrically connecting the second and fourth coil groups to provide a closed electrical path for the flow of current; establishing a transient magnetic field about the second electrically conductive means by injecting a transient electrical pulse into the second electrically conductive means, thereby inducing current flow in the second and fourth coil groups and transferring the one end turn portions of the second and fourth coil groups to a desired position in the core by the electromagnetic force interaction between the second electrically conductive means and the one end turn portion of the second and fourth coil groups.

5. The method of claim 1 wherein the steps of rigidly supporting an electrically conductive means for producing a magnetic field in electromagnetic coupling with one of the end turn portions of the first and third coil groups and shielding said electrically conductive means from the second and fourth coil groups includes supporting an electrically conductive nonmagnetic fixture having slot means at one end and with a coiled electrical conductor supported in the slot means in the bore of the core, the slot means opening only adjacent the first and third coil groups.

6. A method of transferring between initial and desired positions the electrical winding carried by a core having a bore, the core being useful in a dynamoelectric machine, the electrical winding comprising at least four coil groups including first, second, third and fourth groups, each said coil groups having two side portions and two end turn portions, the method comprising the steps of: rigidly supporting means for producing a first magnetic field adjacent the end turn portions of the first and third coil groups, with the first magnetic field cutting the end turn portions of the first and third coil groups; rigidly supporting means for producing a second magnetic field adjacent the end turn portions of the second and fourth coil groups, with the second magnetic field cutting the end turn portions of the second and fourth coil groups; and generating in the four coil groups comprising the electrical winding a high power energy pulse of preselected magnitude to cause a surge of current flow therethrough thereby to establish a transient magnetic field to act with said first and second magnetic fields to transfer the electrical winding to the desired position.

7. A method of transferring between initial and desired positions the electrical winding carried by a core having a bore, the core being useful in a dynamoelectric machine, the electrical winding comprising at least four coil groups including first, second, third and fourth groups, each said coil group having two side portions and two end turn portions, the method comprising the steps of: rigidly supporting first means for producing a magnetic field in electromagnetic coupling with one of the end turn portions of the first and third coil groups; shielding said first magnetic field producing means from the second and fourth coil groups; rigidly supporting second means for producing a magnetic field in electromagnetic coupling with one of the end turn portions of the second and fourth coil groups; shielding said second magnetic field producing means from the first and third coil groups; electrically connecting the four coil groups to provide a closed electrical path for the flow of current; generating in the coil groups a high pulse of energy, thereby producing magnetic fields and transferring the one end turn portions of the coil groups to a desired position in the core by the resulting magnetic interaction of forces.

8. A method of transferring between initial and desired positions the electrical winding carried by a core having a bore, the core being useful in a dynamoelectric machine, the electrical winding comprising at least four coil groups including first, second, third and fourth groups, each said coil group having two side portions and two end turn portions, the method comprising the steps of: supporting first means for producing a magnetic field in electromagnetic coupling with one of the end turn portions of the first and third coil groups; supporting second means for producing a magnetic field in electromagnetic coupling with one of the end turn portions of the second and fourth coil groups; generating opposing magnetic fields between the first magnetic field producing means and the end turn portions of the first and third coil groups; and generating opposing magnetic fields between the second magnetic field producing means and the end turn portions of the second and fourth coil groups thereby to transfer in the core at least the one end turn portion of each coil group by the resulting interaction of forces.

9. A method for effecting desired changes in configuration of an electrical winding and its relative position with respect to a member accommodating side portions of the electrical winding with end portions thereof being exposed, the method comprising the steps of: supporting electrically conductive means next to selected portions of the electrical winding for producing a magnetic field in electromagnetic coupled relation therewith, and supporting structure between the electrically conductive means and other portions of the electrical winding for shielding the electrically conductive means from the other portions; generating at least one electrical energy surge in the electrical winding of sufficient magnitude to effect the desired changes in the configuration and in the relative position during such support, and establishing a transient magnetic field in the vicinity of the electrical winding while establishing electromagnetic coupled relation between the selected portions and the electrically conductive means; and effecting the desired changes in configuration of the electrical winding and its relative position to the member by virtue of the established transient magnetic field, the electromagnetic coupled relation, and the shielded other winding portions, whereby electromagnetic forces are produced which interact with at least the selected portions of the electrical winding for attaining the desired changes.

10. The method of claim 9 in which the supporting and shielding step includes supporting the electrically conductive means next to end portions of the electrical winding and supporting the shielding structure adjacent at least some of the side portions of the electrical winding; and the step of effecting the desired changes in configuration of the electrical winding includes effecting the transfer of the side portions from one position to another with respect to the member by virtue of the at least one electrical energy surge in the at least some side portions of the electrical winding and resultant interaction of electromagnetic forces, produced by the at least one electrical energy surge, between the structure and adjacent side portions.

11. A method for attaining desired alterations and configurations of at least first and second electrical coils carried by a coil-accommodating member in spaced apart relation, with coil side portions being disposed in slots of the member, and with coil end portions extending beyond the slots; the method comprising the steps: supporting first electrical conductive means adjacent an end portion of the first electrical coil for producing a magnetic field and an electromagnetic coupled relation with the end portion, supporting a second electrical conductive means adjacent an end portion of the second electrical coil remote from the end portion of the first electrical coil for producing a magnetic field and an electromagnetic coupled relation with a second electrical coil end portion, and shielding the first and second electrical conductive means respectively from the second and first electrical coils; establishing a transient magnetic field in the vicinity of the first and second electrical coils while creating the electromagnetic coupled relation respectively between the first and second electrical conductive means and their associated coil end portions by generating the transient electrical pulse of preselected magnitude in the first and second coils during the shielding and supporting thereof; and effecting the desired alteration in configuration of the first and second coils by electromagnetic forces acting thereon which result from the transient magnetic field, the electromagnetic coupled relations, and the shielding of the first and second electrical conductive means respectively from the second and first electrical coils.

12. The method in claim 11 in which the shielding of the first and second electrical conductive means respectively from the second and first electrical coils includes supporting an electrically conductive non-magnetic structure in the vicinity of the side portions of the first and second electrical coils and between the first and second electrical conductive means thereby generating eddy currents in the structure for producing an electromagnetic interaction between the side portions and the structure to effect alterations in configuration of the side portions.

13. A method for effecting desired alterations in configuration of at least one electrical coil and in the relative position thereof with respect to a ferromagnetic member accommodating the at least one electrical coil; the method comprising the steps of: supporting at least one magnetizable permanent magnet and a preselected portion of the at least one electrical coil accommodated by the ferromagnetic member adjacent one another; and generating at least one electrical energy surge in the preselected electrical coil portion of sufficient magnitude to effect the desired alterations in the configuration and in the relative position as the at least one permanent magnet and preselected electrical coil portion are being supported adjacent one another, with the at least one electrical energy surge creating a current surge in the preselected coil portion and a transient magnetic field in the vicinity of the preselected coil portion of the magnetizable permanent magnet, and of adjacent regions in the ferromagnetic member for interacting a magnet field produced by the at least one magnetizable permanent magnet, thereby causing electromagnetic forces to act upon the preselected coil portion and to effect the desired alterations in configuration of the at least one electrical coil and in the relative position thereof with respect to the ferromagnetic member.

14. The method of claim 13 in which the at least one electrical coil has an end turn portion extending beyond an end face of the ferromagnetic member, the at least one magnetizable permanent magnet and end turn portion are supported adjacent one another, and during such support, the at least one electrical energy surge is generated in the at least one electrical coil creating a transient magnetic field in the vicinity of the end turn portions of the magnetizable permanent magnet, and of the ferromagnetic member thereby effecting an alteration of the end turn portion from one position to another position relative to the ferromagnetic member.

References Cited

UNITED STATES PATENTS

| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |
| 3,348,183 | 10/1967 | Hodges et al. | |
| 3,353,251 | 11/1967 | Linkous | 29—205 |

CHARLIE T. MOON, *Primary Examiner.*

J. CLIVE, *Assistant Examiner.*